US010729061B2

(12) United States Patent
Kaeb et al.

(10) Patent No.: US 10,729,061 B2
(45) Date of Patent: Aug. 4, 2020

(54) ROTATING DISK ATOMIZER WITH TREATMENT FLUID FEED ARRANGEMENT

(71) Applicant: KSi Conveyor, Inc., Sabetha, KS (US)

(72) Inventors: Paul Arthur Kaeb, Sabetha, KS (US); Bradley S Strahm, Sabetha, KS (US); Jason Paul Kaeb, Sabetha, KS (US)

(73) Assignee: KSi Conveyor, Inc., Sabetha, KS (US)

(*) Notice: Subject to any disclaimer, the term of this patent is extended or adjusted under 35 U.S.C. 154(b) by 372 days.

(21) Appl. No.: 15/443,817

(22) Filed: Feb. 27, 2017

(65) Prior Publication Data

US 2017/0164550 A1 Jun. 15, 2017

Related U.S. Application Data

(63) Continuation of application No. 14/301,735, filed on Jun. 11, 2014, now Pat. No. 9,616,442.

(60) Provisional application No. 61/838,247, filed on Jun. 22, 2013.

(51) Int. Cl.

| | |
|---|---|
| *B05B 7/24* | (2006.01) |
| *A01C 1/00* | (2006.01) |
| *A01C 1/06* | (2006.01) |
| *A01C 1/08* | (2006.01) |
| *B05B 13/02* | (2006.01) |
| *B05B 3/10* | (2006.01) |
| *B05B 12/08* | (2006.01) |

(52) U.S. Cl.
CPC .................. *A01C 1/06* (2013.01); *A01C 1/00* (2013.01); *A01C 1/08* (2013.01); *B05B 3/1035* (2013.01); *B05B 3/1057* (2013.01); *B05B 7/2489* (2013.01); *B05B 12/087* (2013.01); *B05B 13/025* (2013.01); *B05B 3/10* (2013.01)

(58) Field of Classification Search
USPC .... 118/303, 300, 323, 321, 19, 24; 239/223, 239/224, 225.1, 246; 427/212, 425
See application file for complete search history.

(56) References Cited

U.S. PATENT DOCUMENTS

| | | | | |
|---|---|---|---|---|
| 1,782,309 A | | 11/1930 | Ludwig | |
| 3,650,243 A | | 3/1972 | Brehm | |
| 3,934,821 A | | 1/1976 | Mueller | |
| 4,337,895 A | | 7/1982 | Gallen | |
| 4,398,493 A | | 8/1983 | Gillett | |
| 4,407,217 A | | 10/1983 | Jackson | |
| 4,465,016 A | * | 8/1984 | Weber | G01F 11/20 118/303 |
| 4,565,322 A | | 1/1986 | Graber | |
| 4,582,255 A | | 4/1986 | Won | |
| 4,657,773 A | | 4/1987 | Mueller | |
| 4,690,326 A | | 9/1987 | Gill | |
| 4,712,738 A | | 12/1987 | Gill | |
| 4,790,482 A | | 12/1988 | Won | |

(Continued)

*Primary Examiner* — Yewebdar T Tadesse
(74) *Attorney, Agent, or Firm* — Daniel J. Coughlin; Coughlin Law Office LLC

(57) ABSTRACT

A rotary atomizer is disclosed for the even distribution of a treatment fluid within a treatment chamber. The treatment fluid is delivered onto a rotating disk atomizer through multiple outlet ports. Fluid passages provide each outlet port with an even flow of treatment fluid at generally the same time and rate. This even and simultaneous flow of treatment fluid results in a more even distribution of treatment fluid on the seed that flows through the treatment chamber throughout the treatment cycle.

14 Claims, 6 Drawing Sheets

(56) References Cited

U.S. PATENT DOCUMENTS

| | | |
|---|---|---|
| 4,860,955 A | 8/1989 | Gill |
| 4,865,253 A | 9/1989 | Gill |
| 4,874,400 A | 10/1989 | Jury |
| 4,876,111 A | 10/1989 | Guyomard |
| 5,009,369 A | 4/1991 | Iwaszkowiec |
| 5,092,265 A | 3/1992 | Hughes |
| 5,262,098 A | 11/1993 | Crowley |
| 5,738,705 A | 4/1998 | Anderson |
| 5,795,391 A | 8/1998 | Niemann |
| 6,408,785 B1 | 6/2002 | Hoogen |
| 6,565,016 B2 | 5/2003 | Madden |
| 7,083,683 B2 | 8/2006 | Schneidereit |
| 7,150,414 B2 | 12/2006 | Goldin |
| 7,691,431 B2 | 4/2010 | Feng |
| 2011/0027479 A1 | 2/2011 | Reineccius |

* cited by examiner

ROTATING DISK ATOMIZER WITH TREATMENT FLUID FEED ARRANGEMENT

CROSS-REFERENCE TO RELATED APPLICATION

This application is a continuation of application Ser. No. 14/301,735 filed 11 Jun. 2014, which is an application claiming priority of U.S. provisional patent application 61/838,247 filed on 22 Jun. 2013. The above-identified applications are hereby incorporated herein by reference in their entirety.

GOVERNMENT RIGHTS

Not Applicable.

REFERENCE TO CDs

Not Applicable.

FIELD

The present invention is in the technical field of treating seeds.

BACKGROUND

Seeds planted for agricultural and other purposes are often treated with an agrichemical such as insecticides, inoculants, micronutrients or other beneficial compositions prior to planting. Treatment may accomplish various purposes including inhibiting the growth of insects, bacteria, molds, fungus, and parasites that are destructive to the seed and plant growth. Seed treatments are commonly applied by spraying a fluid composition to the surface of seed as the seed falls through a treatment chamber. Direct application of the seed treatment fluid to the seed before planting requires a smaller quantity of seed treatment composition than the traditional field application of treatment fluids.

BRIEF DESCRIPTION

Seed treatment applicators introduce seed into a treatment chamber. In the treatment chamber, airborne droplets of treatment fluid are applied to the seed surface. Generally, the treatment fluid is atomized with a rotating atomizer such as rotating cylinders. The vertical sidewalls of the cylinders incorporate a screen or solid wall with multiple apertures to allow the fluid to escape. These rotating atomizers routinely suffer from clogging and uneven distribution of the treatment fluid.

We discovered that the problems of uneven fluid distribution and clogging of the atomizer can be solved by delivering the treatment fluid onto a rotating disk atomizer through a fluid feed arrangement that directs the flow of treatment fluid evenly through multiple outlet ports. The treatment fluid is evenly applied to the rotating atomizer by directing the treatment fluid from a single inlet port to each outlet port. The fluid passages provide each outlet port with an even flow of treatment fluid at the same time and rate because the volume of each fluid passage is approximately equal to the other fluid passages. This even and simultaneous flow of treatment fluid results in a more even distribution of treatment fluid on the seed that flows through the treatment chamber over the entire treatment cycle.

Some advantages of the present disclosure include an apparatus which provides:

a. A rotating disk that atomizes fluid in an evenly distributed spray without a vertical side wall with apertures or screens that can be clogged by sticky, viscous fluids;

b. A rotary atomizer with a fluid feed arrangement for fluidly connecting a single inlet port with multiple outlet ports where the fluid passage provide an even flow of treatment fluid to the outlet ports;

c. A fluid atomizer with multiple outlet ports evenly distributing the fluid around the central axis of the rotating disk to provide even coverage around the entire perimeter of the disk; and d. An atomizer that is inexpensive to manufacture and requires minimal maintenance.

We recognized that in order to prevent wet, sticky, freshly treated seed from coming in contact with the motor or shaft, the motor should be mounted above the atomizer disk. In order to mount the motor above the disk, the motor shaft descends from the motor through an aperture in the center of the disk. But the presence of the powered shaft in the center of the disk prevents the fluid from being dispersed into the center of the disk atomizer. Existing seed treatment applicators with top mounted motors generally disperse the treatment fluid into a rotating cup atomizer with a single inlet tube. However, these existing solutions result in uneven fluid distribution and clogging of the apertures in the vertical sidewalls of the rotating cup.

A flat disk atomizer eliminates the clogging potential of the rotating cup. However, elimination of the sidewalls exacerbates the uneven distribution of fluid. Existing rotating disk atomizers generally apply the fluid to the center of the rotating disk. The fluid begins to flow in a generally outward direction as a substantially thin film disposed uniformly about the disk surface. When the fluid reaches the edge of the disk, the fluid is sprayed outwardly in small droplets.

We recognized that the asymmetric delivery of fluid onto the flat disk atomizer contributed to the uneven spray pattern. The location of the central shaft prevented applying the fluid to the center of the disk and resulted in significant uneven distribution of the fluid. We solved the uneven fluid spray by applying the treatment fluid to the disk atomizer through multiple outlet ports that are located above the disk. The outlet ports can be generally evenly spaced around the central axis to evenly apply the fluid to the disk. The outlet ports can be positioned such that the treatment fluid contacts the central portion of the rotating disk.

In order to achieve even distribution of the fluid, we found that it is important that the fluid be generally evenly delivered to the top surface of the atomizer disk so that the fluid contact area has generally even, symmetric coverage. We discovered that distribution was most even when three or more outlet ports were generally evenly distributed about the central, vertical axis. This distribution resulted in treatment fluid application that was generally symmetric and evenly distributed. For example, the use of four outlet ports separated by approximately 90 degrees provided a generally even distribution of treatment fluid.

We discovered that the fluid could be delivered to the outlet ports through a fluid feed arrangement. In our primary illustrated example—as will be discussed—we attached a fluid feed arrangement to the bottom of the treatment chamber. Each outlet port is connected to the inlet port by a respective fluid feed arrangement. As illustrated and described below, the fluid passages can be a hollow aperture in an otherwise solid base plate. We discovered that fluid passages of the same volume caused the fluid to evenly and consistently feed the respective outlet ports. That allowed for an even application of the treatment fluid to the seed, from the first seed that entered the treatment chamber all the way through the treatment cycle.

BRIEF DESCRIPTION OF THE DRAWINGS

Aspects of this disclosure are illustrated by way of example, and not by way of limitation, in the accompanying drawings, wherein.

DETAILED DESCRIPTION

Figure 1:
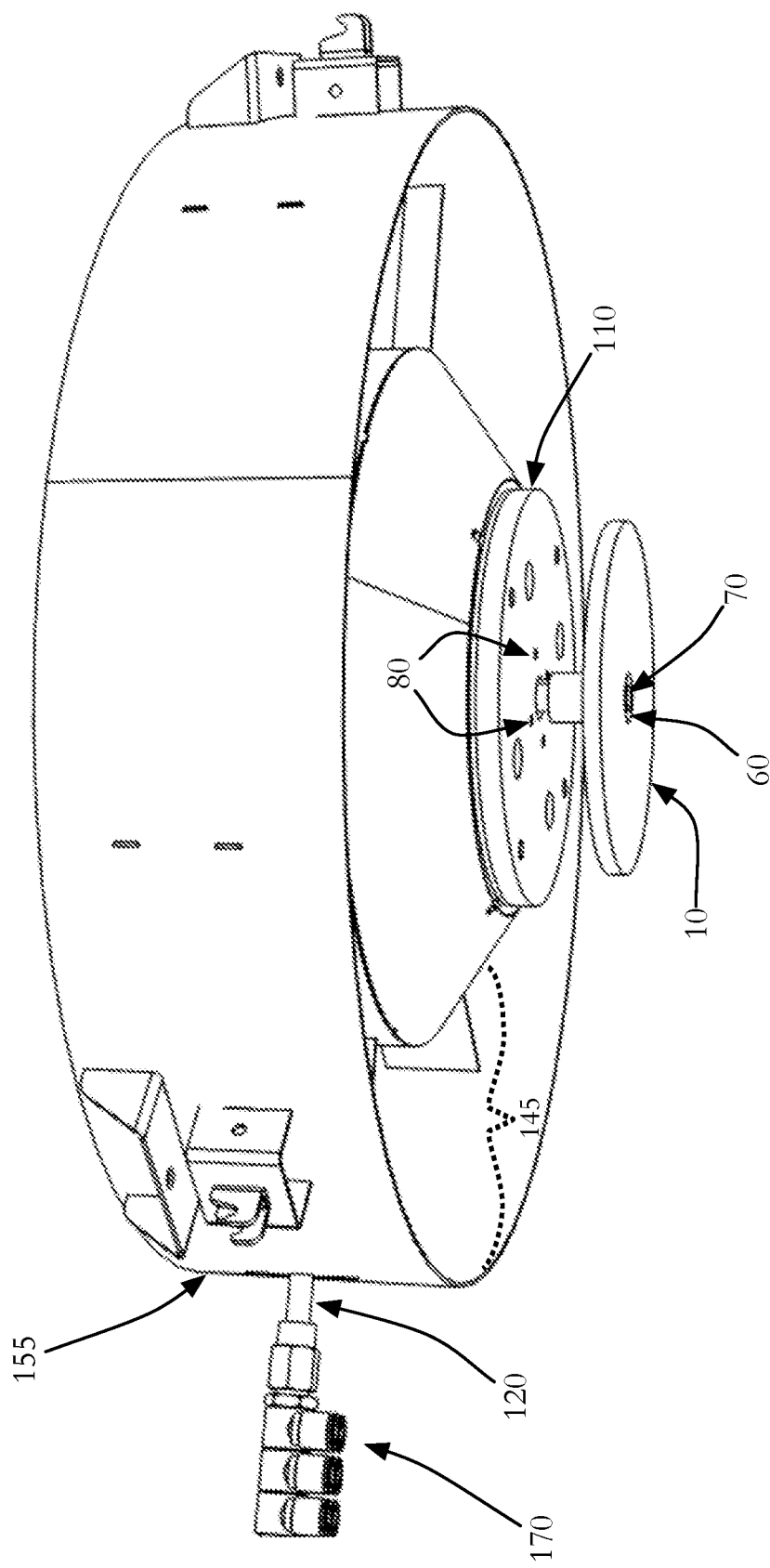
FIG. 1 is a bottom perspective view of the atomizer, showing the treatment chamber, fluid feed arrangement, and the bottom of the disk.
Figure 2:
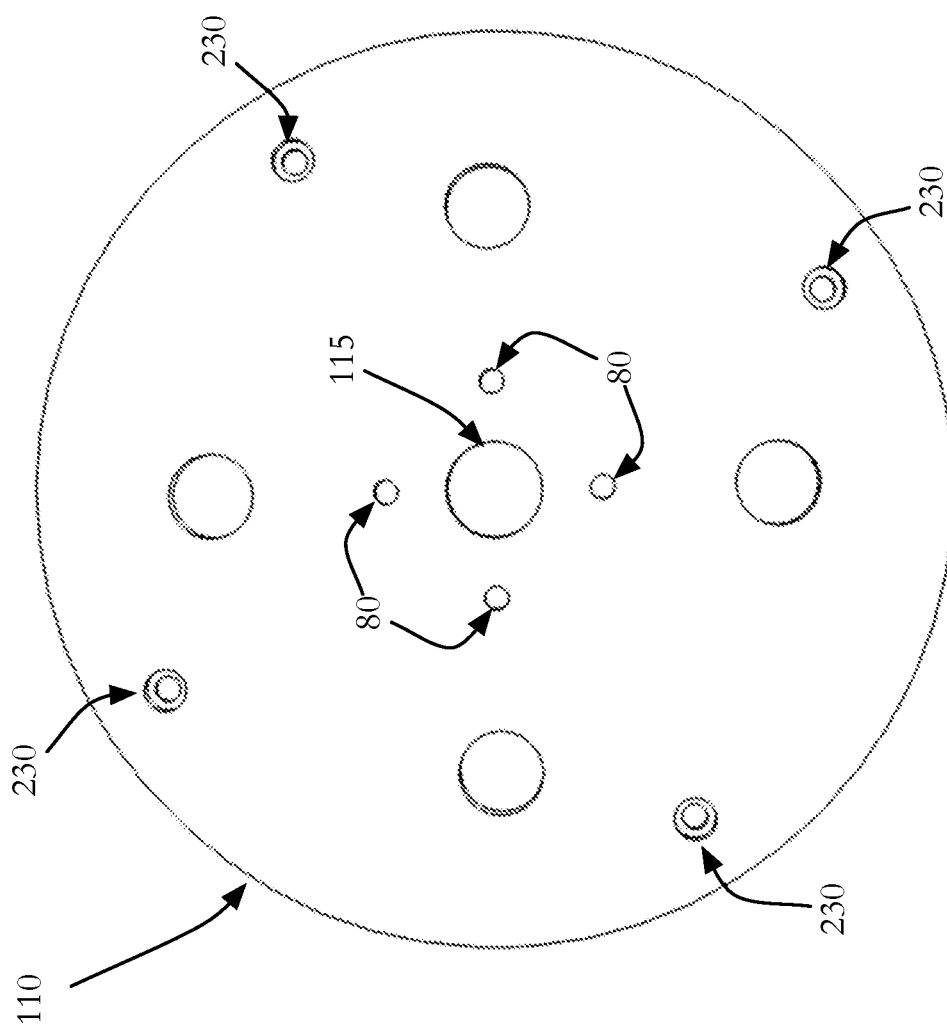
FIG. 2 is a bottom view of the fluid feed arrangement.
Figure 3:
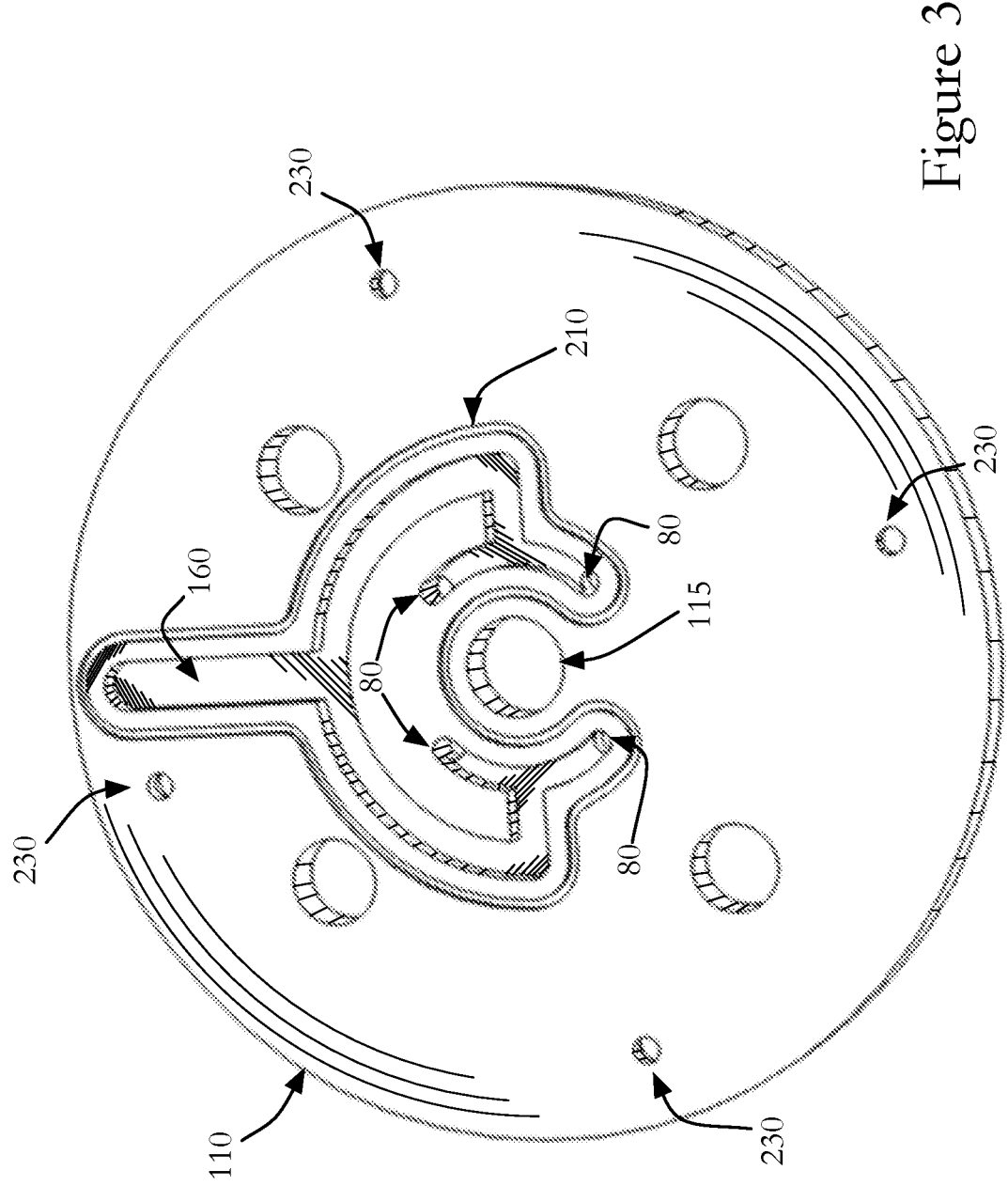
FIG. 3 is a top view of the fluid feed arrangement that—during operation—is pressed against the bottom of the treatment chamber.
Figure 4:
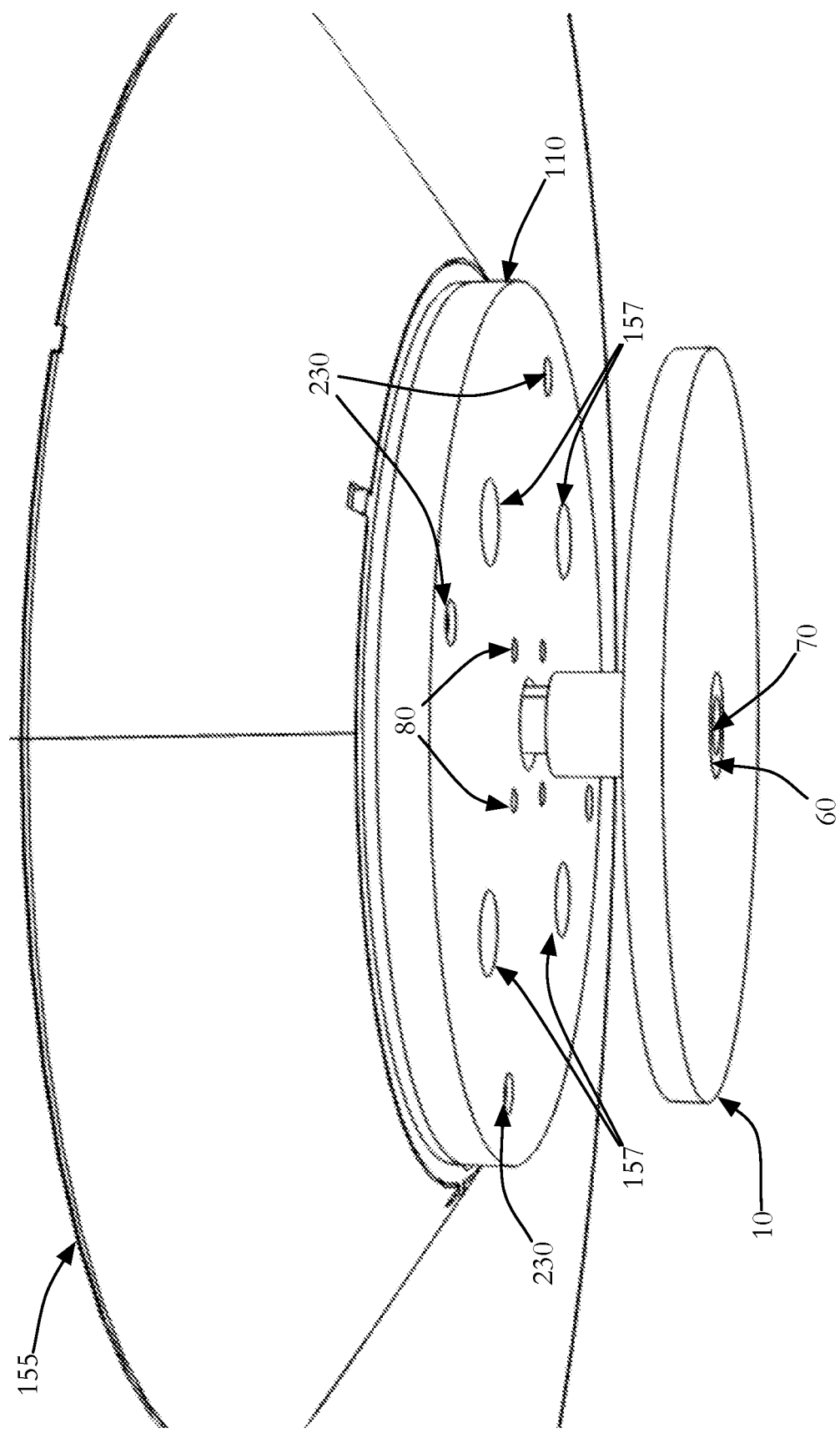
FIG. 4 is the bottom perspective view of FIG. 1, focusing on the fluid feed arrangement.

As briefly explained above, the present inventors recognized that existing seed treatment atomizers produce uneven fluid distribution and require regular maintenance due to clogging of the atomizer and the accumulation of wet and sticky seed around bottom-mounted motors. The inventors recognized that these deficiencies could be resolved. FIG. 1 depicts the atomizer portion of a treatment applicator. A treatment chamber 155 is shown with an annular aperture 145 that receives a ring, or annular veil, of untreated seed. The untreated seed descends through the annular aperture 145 of the treatment chamber 155. A rotating disk 10 is mounted in the center of the treatment chamber 155.

As the seed descends through the treatment chamber 155, the treatment fluid is applied to the rotating disk 10 to atomize the treatment fluid and create an even, outward spray of treatment fluid against the inner surface of the ring of seed. The treatment fluid is applied to the disk 10 from more than one outlet ports 80 that are positioned in a fluid feed arrangement 110 that is mounted above the disk.

The treatment applicator is designed to apply treatment fluid to all of the untreated seed that enters the treatment chamber. Treatment fluid is introduced into the treatment applicator through an inlet port 130 that is depicted in the top view of the treatment chamber 155 in FIG. 6. The fluid flows into the inlet port 130 and then into the fluid feed arrangement 110.

The fluid feed arrangement 110 is depicted in FIGS. 2 and 3. The fluid feed arrangement 110 receives the treatment fluid from the inlet port 130 and directs the flow of treatment fluid to a plurality of outlet ports 80. The outlet ports are shown in the bottom of the fluid feed arrangement 110 as depicted in FIG. 2. The bottom of the fluid feed arrangement 110 is positioned directly above the rotating disk 10. The treatment fluid is expelled through a plurality of outlet ports 80 onto the top surface of the rotating disk 10. The outlet ports 80 are annularly positioned around the central vertical axis 40 to provide a generally symmetric flow of the treatment fluid to a top surface of the disk 10.

The top of the fluid feed arrangement 110 is depicted in FIG. 3 and shows one embodiment of a plurality of fluid passages 160 for connecting the inlet port 130 with the plurality of outlet ports 80. A plurality of fluid passages 160 connect the inlet port 130 with each of the outlet ports 80. The fluid passages 160 are depicted in FIG. 3. The size, length, shape, and volume of the fluid passages 160 between the inlet port 130 and each respective outlet port 80 is generally the same. This design delivers a generally equal volume of fluid that begins to flow generally simultaneously through each outlet port 80 from the single inlet port 130. The generally symmetric placement of the outlet ports 80 and the generally equal fluid flow delivers a generally even amount of fluid for atomization by the rotating disk 10. The fluid feed arrangement 110 applies treatment fluid to the disk 10 generally symmetrically relative to the central vertical axis, which is indicated by line 40.

In order to disperse the treatment fluid symmetrically, the treatment fluid is dispersed from plurality of outlet ports 80 onto the disk 10. The fluid feed arrangement 110 is illustrated with four outlet ports 80. The outlet ports 80 are evenly spaced about the central axis of the disk 10. The outlet ports 80 are positioned above the central portion of the disk. The position of the outlet ports defines a plurality of fluid contact areas 100 on the top surface 20. The top surface 20 is the fluid dispensing surface of the disk 10.

When applying treatment fluid to the untreated seed, it is important that treatment fluid is applied evenly to all of the untreated seed that enters the treatment chamber. The untreated seed is generally placed into a hopper located above the treatment chamber 155. A treatment cycle begins when the first amount of untreated seed enters the treatment chamber concurrently with the first amount of treatment fluid is sprayed into the path of the seed. It is preferred that an even spray of treatment fluid is consistently delivered within the treatment chamber 155 during the entire treatment cycle. The treatment cycle ends when the last untreated seed falls through the treatment chamber 155. The fluid passages 160 provide a consistent flow of treatment fluid to all of the outlet ports 80, such that the treatment fluid can be evenly sprayed over the entire treatment cycle.

The fluid feed arrangement 110 delivers the treatment fluid to the outlet ports 80. The fluid descends from the outlet ports 80 onto the disk 10. The fluid contact areas 100 are illustrated as evenly spaced around a circumference about the central axis that has a radius of less than half of the radius of the disk atomizer. It is important that the fluid contact area 100 is nearer the central vertical axis 40 of the disk 10 than the outer periphery 50 of the disk. Distributing the fluid nearer the central vertical axis 40 of the disk 10 allows the rotation of the disk to impart a sufficient outward velocity onto the fluid to cause the fluid to be outwardly atomized toward the annular veil of seed (not shown). The central distribution of the fluid contact area 100 facilitates the outward moment to the treatment fluid. The outlet ports 80 can be annularly disposed such that the radius of the outlet port position from the central vertical axis is less than half of the total radius of the disk 10.

It is preferred that each fluid contact area 100 is not separated from an adjacent fluid contact area 100 by more than 120 degrees. These regular intervals result in substantially thin film of treatment fluid that is disposed uniformly about the top surface 20 of the disk 10. When the fluid reaches the outer periphery 50 of the disk, the fluid is sprayed outwardly in small droplets toward the annular veil of untreated seed.

FIGS. 4 and 5 depict the orientation and relation between the fluid feed arrangement 110 and the disk 10. In the illustrated example, the motor 150 is positioned above the rotating disk 10 to prevent the motor or shaft from interfering with the flow path of the wet, sticky seed. The rotating disk 10 is turned with a powered shaft 70 that enters the central disk aperture 60 from above.

Figure 5:
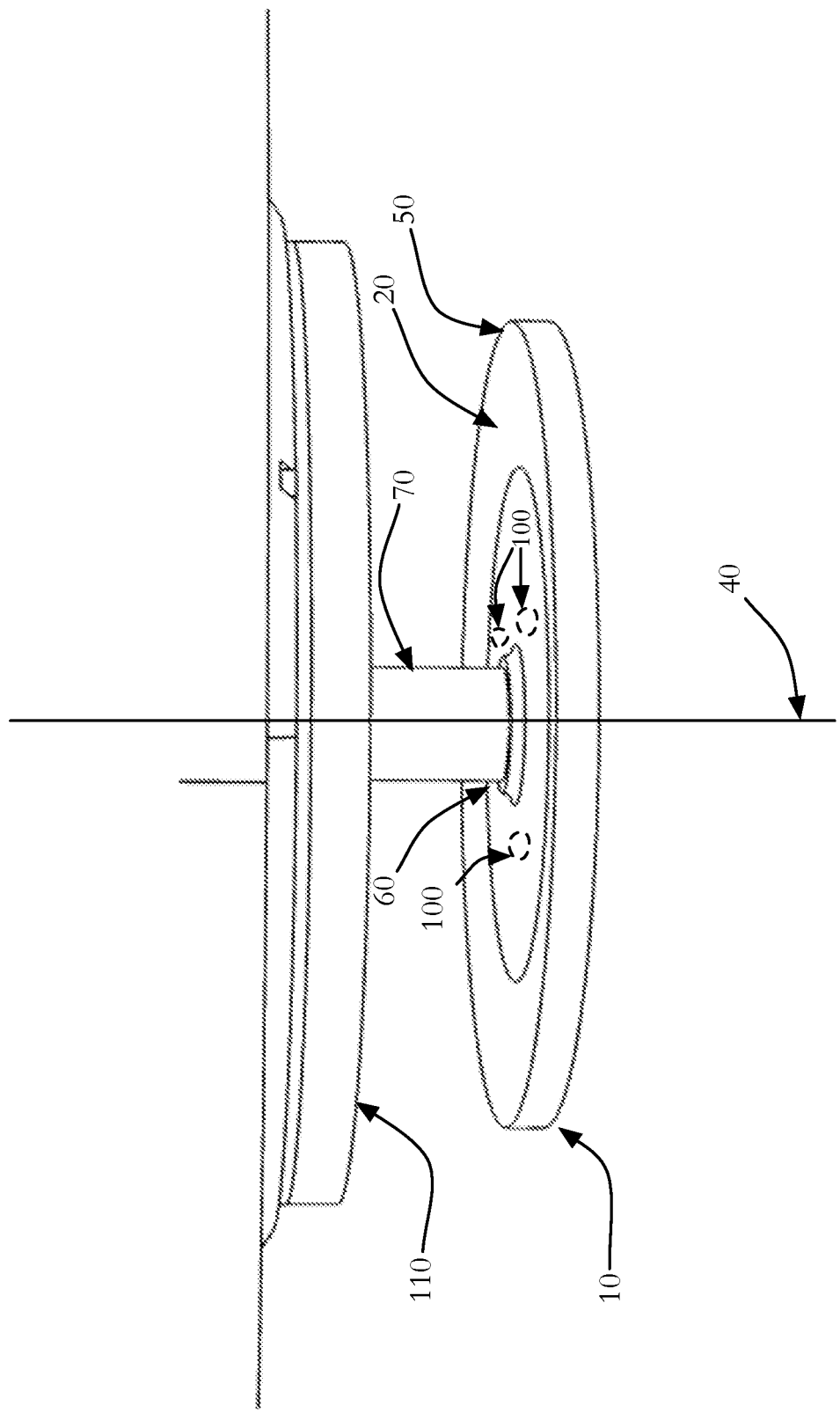
FIG. 5 is a side perspective view of the atomizer disk.
Figure 6:
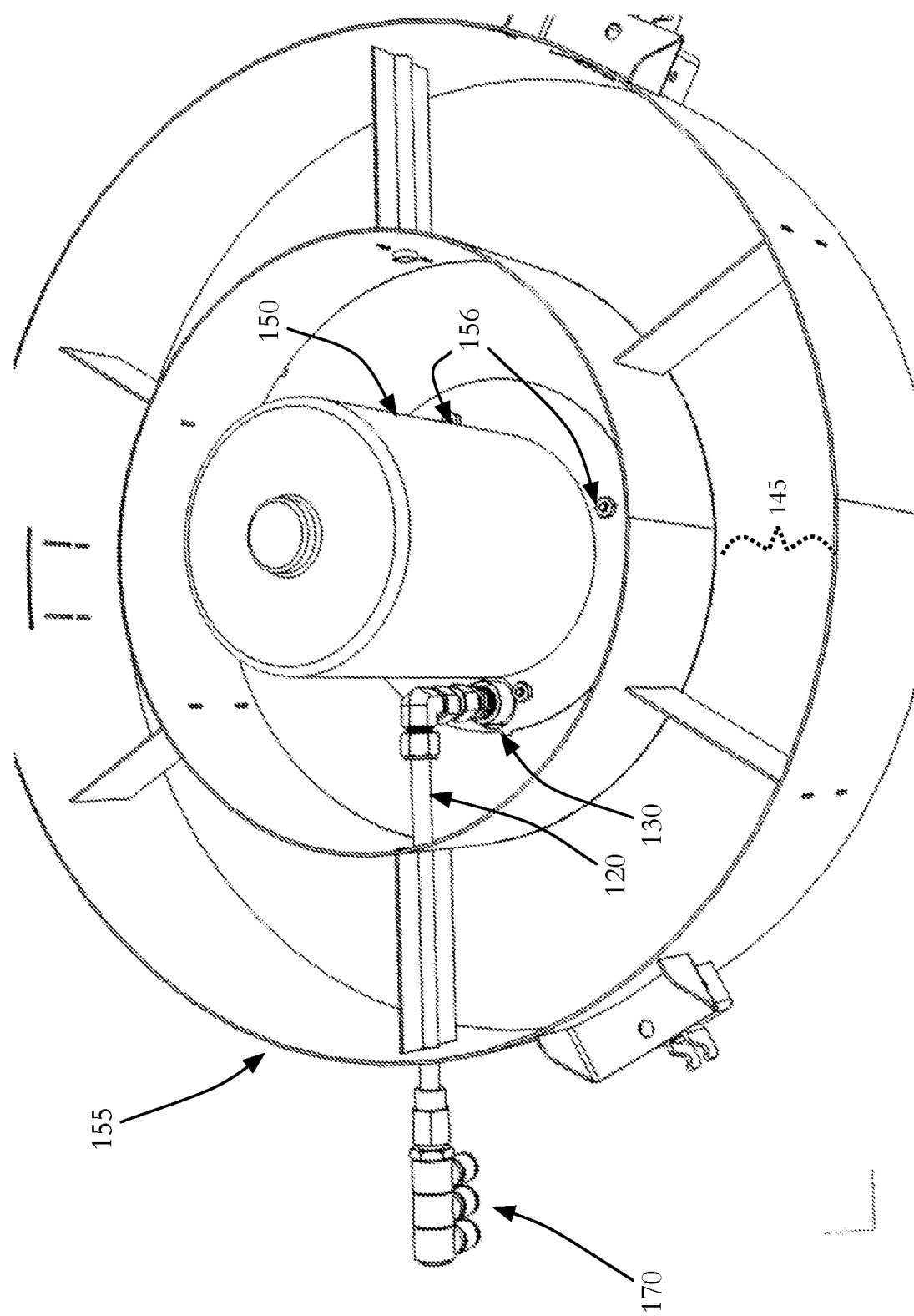
FIG. 6 is a top perspective view of the atomizer, showing the motor attachment and the incoming fluid feed.

FIG. 5 depicts another advantage of the current disclosure over existing seed treatment atomizers. The disk 10 depicted is a generally flat disk that eliminates the clogging potential of the rotating cup, however elimination of the sidewalls exacerbates any asymmetric distribution of fluid, therefore it is important to utilize an even fluid application, as described above. The disk 10 depicted in FIG. 5 has a central area thickness that is less than the thickness at the outer periphery 50. This provides a slope between the center periphery 55 and the outer periphery 50. However, the advantages of this disclosure would also benefit a variety of disk shapes, including: flat disks, disks with radial or circumferential grooves, disks with vertical sidewalls, cone-shaped disks, and other rotating disk atomizer configurations that are compatible with a top driven powered shaft.

FIG. 6 depicts a motor 150 attachment to the treatment chamber 155 and a path for the inlet tube 120 to enter the treatment chamber 155. The top driven motor location prevents the motor from interfering with the path of the wet, freshly treated seed. Here, the motor 150 is mounted to the treatment chamber 155 with a series of motor fasteners 156. The mixing manifold and inlet tube 120 facilitate the flow of treatment fluid from one or more external source treatment fluid sources. The fluid flows through the inlet port, which is fluidly connected to the fluid passage 160 and ultimately through the outlet ports onto the rotating disk 10.

Referring again to FIG. 4, the fluid feed arrangement 110 can also be mounted on the treatment chamber 155 with a seal in the seal channel 210 to provide a fluid passage 160 that is fluid-tight. The fluid feed arrangement 110 can be attached to the treatment chamber with fasteners that pass through the appropriate fastener passages 230 in the fluid feed arrangement. These fasteners can be received into the treatment chamber 155 to securely mount the fluid feed arrangement 110. The fluid feed arrangement 110 can also include a series of access ports 157 to provide access to the motor fasteners 156, which would otherwise be obscured by mounting the fluid feed arrangement at the base of the treatment chamber 155.

The powered shaft 70 is illustrated as being driven by a motor 150 from above with the powered shaft extending downward. The powered shaft 70 could also be powered by appropriately powered pulley, gear driven shaft, or other appropriate means of rotating the disk 10.

Referring again to FIG. 4, the disk 10 is secured to the powered shaft 70 such that when the powered shaft 70 rotates then the disk 10 also rotates. The lower end of the powered shaft extends through a central disk aperture 60. The disk may have a lower extension that is threaded to receive a fastening bolt. The fastening bolt can be threadably received into the lower extension until the fastening bolt passes through a wall of the extension and exerts an appropriate pressure on the powered shaft 70 to securely mount the disk 10 to the powered shaft 70.

The fluid passage 160 is depicted in FIG. 3 as a hollow channel in a solid fluid feed arrangement 110 that is mounted against the bottom of the treatment chamber 155 with a seal that provides a fluid-tight fluid passage. The fluid passage 160 can also be any means of transferring an even flow of fluid to the plurality of outlet ports 80. For example, the fluid passage 160 may be any manner of plastic or metal tubing that delivers treatment fluid to the outlet ports 80.

Referring again to FIG. 3, the fluid passage 160 is shown as a channel cut into a solid block of material, such as plastic. A seal (not shown) can be placed into the seal channel 210 to allow the fluid passage 160 retain the fluid when the fluid feed arrangement 110 is mounted to the bottom of the treatment chamber 155. Therefore the passageway is defined by the channel cut into the solid block of material that is fluidly sealed to the bottom of the treatment chamber. The seal can be of any material that provides a fluid-tight contact between the treatment chamber 155 and the fluid feed arrangement 110. The seal can be made of rubber, plastic, or other suitable material.

It should be understood that the fluid passage 160 could also be formed with a passageway that is completely enclosed within the fluid feed arrangement. It is also possible that the fluid passage could be formed with tubes, pipes, passages, or channels and with any combination of tubes, pipes, passages, or channels that would provide generally simultaneous and equal flow rates to each of the outlet ports.

A control system (not shown), such as a computer, can be operably connected to various elements of this system. The control system may selectively control the flow of fluids by regulating a treatment fluid regulator. The treatment fluid regulator may control the flow of fluid from one or more fluid pumps that feed the mixing manifold. The treatment fluid regulator may be a fluid pump, such as a peristaltic pump. The control system may also receive signals from a treatment fluid meter that indicate flow rate of the fluid into the input port. The treatment fluid meter may be a loss-in-weight flow meter, a volumetric flow meter, or another meter capable of accurately determining liquid flow rate.

The control system may also selectively control the flow of seed into the treatment chamber. The flow rate of the seed may be controlled using a seed flow regulator. The seed flow regulator may be a variable seed gate or a volumetric seed wheel. The control system may also receive signals from a seed flow meter that indicate the flow rate of the untreated seed into the treatment chamber. The seed flow meter may be a loss-in-weight scaling system, a volumetric seed wheel, or another meter capable of accurately determining seed flow rate.

The control system may also selectively control the speed and rotational direction of the rotating disk through a motor controller.

A compressed air source (not shown) may also be fluidly connected to the fluid passages 160. A valve can regulate the flow of compressed air between the compressed air source and the fluid passages 160. The valve can be controlled by the control system to selectively allow the compressed air to enter the fluid passages. Introduction of the compressed air at the end of a treatment cycle will force any residual treatment fluid out of the fluid passages, through the outlet ports. This will prevent any residual treatment fluid from remaining in the fluid passages and contaminating subsequent treatment cycles. This purging cycle will also prevent residual treatment fluid from drying inside of the fluid passages and blocking the flow of treatment fluid. It should be understood that the compressed air source could be replaced by another compressed gas or liquid and accomplish a purge of the fluid passages.

In one example, the fluid is fed into the inlet port from an inlet tube connected to a mixing manifold. The mixing manifold 170 can deliver treatment fluid to an inlet tube 120 that is connected to the inlet port 130 of the fluid feed arrangement 110. The mixing manifold 170 allows multiple fluids to be delivered to the single inlet port. When treatment fluid is delivered to the atomizer, the treatment fluid flows through a mixing manifold, into the inlet tube, then to the inlet port, through the respective fluid passages, and then drains out the outlet ports and onto the rotating atomizer disk to be atomized and applied to the seed.

Treatment fluid is delivered to the mixing manifold 170 by a fluid connection to a treatment source, such as one or more treatment tanks. In one embodiment, the fluid from the treatment tanks will be pumped using a fluid pump such as peristaltic pumps, which draw treatment fluid from the tanks and deliver pressurized treatment fluid to the mixing manifold 170 and subsequently the inlet port 130. The treatment tanks and fluid pumps required to deliver pressurized treatment fluid are known in the art.

In the Summary above, the Detailed Description, and in the accompanying drawings, reference is made to particular features including method steps of the invention. The reader should understand that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally. It is understood that the invention is not confined to the particular construction and arrangement of parts herein described. That although the drawings and specification set forth a preferred embodiment, and although specific terms are employed, they are used in a description sense only and embody all such forms as come within the scope of the following claims.

The term "comprises" and its grammatical equivalents are used in this document to mean that other components, steps, etc. are optionally present. For example, an article "comprising" or "which comprises" components A, B, and C can consist of components A, B, and C, or can contain not only components A, B, and C but also one or more other components.

The invention claimed is:

1. A treatment chamber for evenly applying a treatment fluid to a flow of seed in a seed treatment system, the treatment chamber comprising:
   a. a fluid feed arrangement mounted within the treatment chamber, the fluid feed arrangement comprising:
      i. a first discharge aperture;
      ii. a fluid passageway configured to receive a pressurized fluid and direct the pressurized fluid to the first discharge aperture; and
      iii. a seal channel disposed on a top surface of the fluid feed arrangement configured to receive a seal;
   b. a rotating disk mounted within the treatment chamber;
   c. the seal disposed within the seal channel; and
   d. wherein the fluid feed arrangement is mounted within the treatment chamber and disposed above the rotating disk.

2. The treatment chamber of claim 1, further comprising:
   a. a powered shaft connected to the rotating disk from above;
   b. wherein the fluid feed arrangement further comprises:
      i. a central disk aperture disposed above a center of the rotating disk; and
   c. wherein the powered shaft extends through the central disk aperture.

3. The treatment chamber of claim 1, wherein the fluid feed arrangement further comprises:
   a. wherein the first discharge aperture is one of a plurality of discharge apertures; and
   b. wherein the fluid passageway is configured to direct the pressurized fluid to each of the plurality of discharge apertures.

4. The treatment chamber of claim 3, wherein the seal channel is disposed along an outer perimeter of the fluid passageway.

5. The treatment chamber of claim 1, wherein:
   a. the fluid passageway is a channel in a surface of the fluid feed arrangement; and
   b. the fluid passageway cooperates with the seal and a portion of the treatment chamber to provide a fluid-tight passage for a pressurized fluid.

6. The treatment chamber of claim 1, further comprising:
   a.
   b. a powered shaft connected to the rotating disk from above;
   c. wherein the fluid feed arrangement further comprises:
      i. an aperture disposed above a center of the rotating disk; and
   d. wherein the powered shaft extends through the central disk aperture.

7. A method of evenly applying a treatment fluid to a flow of seed within a treatment chamber, the method comprising:
   a. providing the treatment chamber of claim 1;
   b. rotating the rotating disk within the treatment chamber;
   c. supplying the fluid feed arrangement with a pressurized flow of the treatment fluid;
   d. supplying the treatment chamber with the flow of seed;
   f. dispensing the treatment fluid from the first discharge aperture to a top disk surface of the rotating disk; and
   g. atomizing the fluid into the flow of seed to evenly apply the treatment fluid to the flow of seed.

8. The method of claim 7, further comprising the step of:
   a. delivering a metered rate of pressurized fluid that corresponds with a metered quantity of seed entering the treatment chamber.

9. The method of claim 8, further comprising the step of purging the treatment fluid from the fluid passageway by introducing a pressurized gas into the fluid feed arrangement through a inlet port.

10. A treatment chamber for evenly applying a treatment fluid to a flow of seed in a seed treatment system, the treatment chamber comprising:
    a. a fluid feed arrangement mounted within the treatment chamber, the fluid feed arrangement comprising:
       i. a plurality of discharge apertures that are radially symmetrically distributed about a central axis of the fluid feed arrangement;
       ii. a fluid passageway configured to receive a pressurized fluid and direct the pressurized fluid to the plurality of discharge apertures;
       iii. a seal channel disposed on a top surface of the fluid feed arrangement configured to receive a seal;
    b. a rotating disk mounted within the treatment chamber, wherein the fluid feed arrangement is mounted within the treatment chamber and disposed above the rotating disk; and
    c. wherein the plurality of discharge apertures have a radial distance from a center of the fluid feed arrangement that is less than one-half of a radius of the rotating disk.

11. The treatment chamber of claim 10, wherein the seal channel is disposed along an outer perimeter of the fluid passageway.

12. The treatment chamber of claim 10, wherein:
    a. the fluid passageway is a channel in a surface of the fluid feed arrangement; and b. the fluid passageway cooperates with the seal and a portion of the treatment chamber to provide a fluid-tight passage for a pressurized fluid.

13. The treatment chamber of claim 10, further comprising:
   a. a powered shaft connected to the rotating disk from above;
   b. wherein the fluid feed arrangement further comprises:
      i. a central disk aperture disposed above a center of the rotating disk; and
   c. wherein the powered shaft extends through the central disk aperture.

14. A method of evenly applying a treatment fluid to a flow of seed within a treatment chamber, the method comprising:
   a. providing the treatment chamber of claim 10;
   b. supplying the fluid feed arrangement with a pressurized flow of the treatment fluid;
   c. supplying the treatment chamber with the flow of seed; and
   d. atomizing the treatment fluid into the flow of seed to evenly apply the treatment fluid to the flow of seed.

* * * * *